(12) United States Patent
Yang

(10) Patent No.: US 7,107,410 B2
(45) Date of Patent: Sep. 12, 2006

(54) EXCLUSIVE STATUS TAGS

(75) Inventor: Jaehyung Yang, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 10/337,610

(22) Filed: Jan. 7, 2003

(65) Prior Publication Data

US 2004/0133749 A1    Jul. 8, 2004

(51) Int. Cl.
G06F 12/00 (2006.01)
G06F 13/00 (2006.01)

(52) U.S. Cl. ............... 711/144; 711/118; 711/141

(58) Field of Classification Search ....... 711/141–146, 711/100, 118, 154
See application file for complete search history.

(56) References Cited

U.S. PATENT DOCUMENTS

| | | | | |
|---|---|---|---|---|
| 4,394,731 A | * | 7/1983 | Flusche et al. ............ | 711/145 |
| 4,513,367 A | * | 4/1985 | Chan et al. ............... | 711/145 |
| 5,297,269 A | * | 3/1994 | Donaldson et al. ........ | 711/145 |
| 5,680,576 A | * | 10/1997 | Laudon ..................... | 711/145 |
| 5,893,144 A | * | 4/1999 | Wood et al. ............... | 711/122 |
| 6,289,420 B1 | * | 9/2001 | Cypher ..................... | 711/144 |
| 6,654,858 B1 | * | 11/2003 | Asher et al. .............. | 711/144 |
| 2002/0112132 A1 | * | 8/2002 | Lesmanne et al. ......... | 711/141 |
| 2003/0009638 A1 | * | 1/2003 | Sharma et al. ............ | 711/145 |

* cited by examiner

Primary Examiner—Tuan V. Thai

(57) ABSTRACT

The disclosed embodiments relate to exclusive status tags. A multiprocessor computer system may include multiple processors and caches that may be managed by a directory or snooping. To optimize the performance of the system, the status and ownership information of the cache lines in exclusive state may be located in a separate cache, a separate portion of the memory, or separate circuitry. By having the status and ownership information in an additional logic, the multiprocessor computer system can operate in a more efficient manner by having an exclusive status tag logic limit the traffic to a collection of status tags, such as a directory or act as a coherence filter.

18 Claims, 5 Drawing Sheets

EXCLUSIVE STATUS TAGS

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing a gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands and thousands of software applications ranging from games to word processors and from voice recognition to web browsers.

One of the most important advances in recent years is the development of multiprocessor computer systems. These powerful computers may have two, four, eight or even more individual processors. The processors may be given individual tasks to perform or they may cooperate to perform a single, large job.

In a multiprocessor computer system, processors may control specific processes. One of the processors may be designated to boot the operating system before the other processors are initialized to do useful work. Typically, the processor designated to boot the operating system is referred to as the bootstrap processor or BSP. The other processors in the system are typically designated application processors or APs. The system memory in a multiprocessing computer system may be connected to one of the processors, which may be referred to as a home processor or home node. Other processors may direct requests for data stored in the memory to the home node, which may retrieve the requested information from the system memory.

Each processor in the computer system may include a cache memory system, which may be integrated into the processor or external to the processor to enhance the performance. A cache memory may include the most recently accessed data or data sorted in a particular manner, which may be stored in a location to allow fast and easy access to the data. By saving this data in the cache memory system, execution time may be reduced and bottlenecks prevented by having data quickly accessible during the operation of a program. For instance, software programs may run in a relatively small loop in consecutive memory locations. To reduce execution time, the recently accessed lines of memory may be stored in the cache memory system to eliminate the time associated with retrieving the program from memory. Accordingly, as the speed of the system increases, the expense of the system may increase as well. Thus, in designing a cache memory system, speed and associated cost limitations may influence the configuration.

In designing a cache memory configuration, levels may be utilized to further enhance the performance of the system. In the various configurations, the number of cache levels may be adjusted or the interaction between levels may be modified in organizing the cache to specific requirements. For instance, in a two level cache system, a first level cache maintains a certain amount of data and a second level of cache may include data within the first level cache along with other additional data. By structuring the cache into levels, an efficient method of access to data may be used through a hierarchical configuration. In the system, the higher level caches may remain smaller with limited amounts of data, while lower level caches may include larger amounts of data. For instance, if the first level cache is unable to supply the data (i.e. the cache misses), then the second level cache may be able to supply the data to the requestor. With the second level cache supplying the data, the system does not have to access the slower main memory for the requested data. One of the objects of the cache levels may be to provide the data from the caches, which are faster than accessing the memory.

To maintain cost and provide efficiency, a cache memory system may include a large amount of dynamic random access memory ("DRAM") along with static random access memory ("SRAM"). As SRAM is capable of providing faster access, it may be utilized as a memory cache to store frequently accessed information and reduce access time for the computer system. In selecting the appropriate combination of SRAM and DRAM, the cost and speed of the different memories may be utilized to design the appropriate cache. SRAM may be more expensive, but may enable faster access to the data. While DRAM may be less expensive, it may provide slower access to the data. As the access speed and cost factors may influence the design of the system, the DRAM may be utilized at lower cache levels, while SRAM is utilized at higher cache levels. This allows the cache memory system to be efficient and cost effective.

In addition, the design of the cache memory system may be influenced by the information provided within the system. In providing information, the cache memory system may have the cache divided into individual lines of data. The individual cache lines may include information that is unique to that cache line, such as cache line data and associated cache tag information. Cache line data may include information, instructions, or address information for the particular line of cache. Similarly, the cache tag may include information about the status of the cache line and other information. Based on the information provided in each of the lines, the cache memory system may enhance the memory system.

As another design factor, the structure and size of the caches may influence operation. For instance, if the lower cache levels are the same size or smaller than the upper cache levels, then the lower level caches may not be able to include all of the information within the upper level caches and satisfy the inclusion principle. Under the inclusion principle, the lower cache levels may include information within any upper cache levels that are connected to the lower cache level in addition to other information. This allows the lower cache level to provide additional functionality to the system, may enable the system to operate more efficiently, and may assist in maintaining the cache coherency. Further, problems or complications may arise with the cache coherency protocol because the lower cache levels do not include the upper level information, which results in the lower level caches being unable to respond to requests or probes. Thus, for the second level cache to provide this enhanced functionality, the second level cache may be larger than the first level cache because it includes more data than the first level cache. Accordingly, as the cache levels or networking between levels increases, the amount of the SRAM implemented in the cache levels may increase dramatically.

To operate the cache structure, a cache memory system may include a cache controller to track the information within the cache memory. In operation, the cache controller may respond to requests from processors, thus reducing the wait time in the system. The cache controller may be utilized to control the flow of data or information within a cache memory system. For instance, a request for data may be received by the cache controller, which may review the request to determine the appropriate action. If the cache controller determines that the information is within the memory cache, it may respond to the requestor without any wait time being incurred. However, if the cache controller does not have the information, then the information may be accessed from other memory, which will likely increase the wait time. Accordingly, the cache controller may be able to manage the information within the memory to better increase performance.

To operate properly with a cache controller, the cache memory subsystem should maintain the latest updated information to insure that the cache includes the most recent data and is consistent between the multiple caches and microprocessors. The maintenance of the data within the cache may be referred to as cache consistency or coherency. Data integrity may be comprised if the copy of the line in cache no longer matches the data stored in memory. Various techniques may be used to identify and control the individual lines of the cache. In a multiprocessor computer system, several cache systems may exist, which further complicates the complexity of maintaining the various caches.

With complex multiprocessor systems, a directory may be utilized to control the flow of information and ensure that the consistency of the cache is maintained. The directory may act as a central controller that tracks and maintains the various lines of cache within a system. With a directory, various systems communicate to the directory to request data. For the directory to function in the system, a cache consistency model may be used to handle the complexity of a multi-processing environment and may enable the directory to manage the caches.

To handle the complexity of multi-processing environment, a status model, such as the MESI cache consistency model, may provide a method for tracking the states of the information in each cache line. Under the MESI cache consistency model, four states that may exist for a cache line, such as modified, exclusive, shared, and invalid. The modified state may indicate that the cache line has been updated and may alert systems to write the modified line to memory. The exclusive state may indicate that the cache is not available at other caches. The shared state may indicate that copies of cache line are located in other caches, while the invalid state may indicate that the cache line is not present, uncached, or contains invalid data. These states may be used in handling the requests for cache lines.

Under the directory based cache coherency system, each processor may maintain a list of cache information and may manage by a directory, which may include the state and owner of the cache line. In maintaining this directory, a coherency protocol may be utilized to control the flow of information within the system. For the list to be properly maintained, the directory is consulted with each communication or request related to data lines in the memory. This allows the directory to maintain the caches with the most recent and correct data. However, a problem with this design is that the cache list or directory may become the central point for contention and frequently is a bottleneck, which results in increased effective memory latency. In addition, if a cache line is in the exclusive state, then a request path for that cache line may be substantially increased because the request for a cache line will flow to the directory and then to the owner of the cache line, back to tag directions, and back to the requester. Thus, the resulting transaction path from the directory may increase the response time.

BRIEF DESCRIPTION OF THE DRAWINGS

Advantages of the disclosed embodiments may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiment may provide an improved approach that may address one or more of the issues discussed above, while enhancing the performance of a multiprocessor system. With multiprocessor systems, cache systems may be utilized to improve performance. The cache system may be managed by a directory in a directory based system or snooping in a snoop-based system, which handles requests and maintains the cache coherency. Coherency filters may be used to further enhance the performance of the snoop-based system. Under the disclosed embodiments, the cache coherency is maintained while the transaction paths or effective memory latency for various requests may be reduced. By reducing the transaction path or effective memory latency, the disclosed embodiments may enhance performance, while maintaining the integrity of the cache.

For instance, while not limited in any way to such applications, the disclosed embodiments may enable a multiprocessor computer system to operate in a more efficient manner by having an exclusive status tag logic limit the traffic to a collection of status tags, such as a directory or act as a coherency filter. In some embodiments, an exclusive status tag logic may be connected to a collection of status tags and may handle requests to the collection of status tags for specific data in a certain state. By having the exclusive status tag logic handle certain states, such as data in the exclusive state, the disclosed embodiment may be able to reduce the response path and limit the directory lookups. Thus, the disclosed embodiments may be able to enhance the systems performance.

Figure 1:
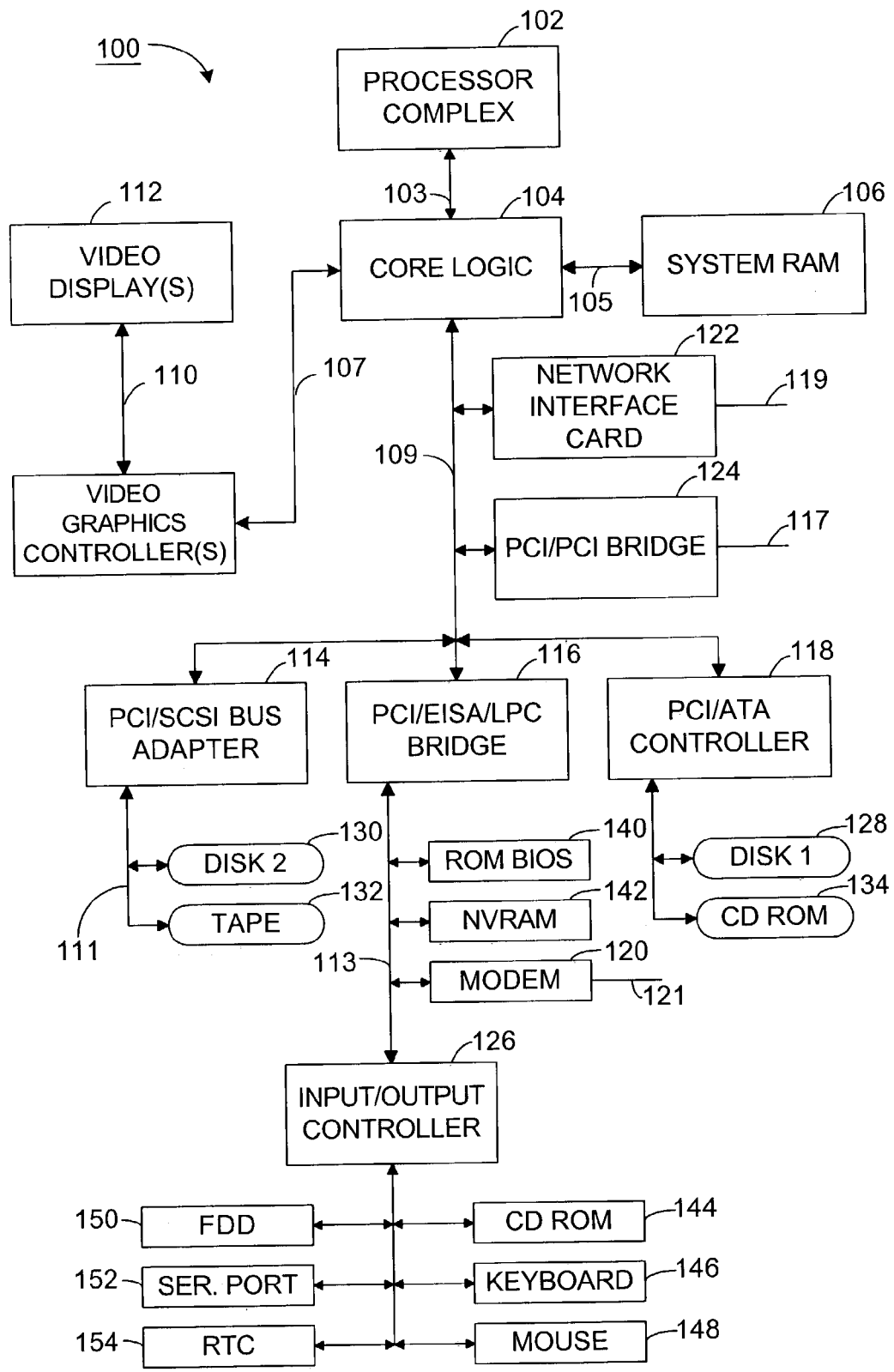
FIG. 1 is a block diagram illustrating an exemplary multiprocessor computer system in accordance with embodiments of the present invention.

Referring now to FIG. 1, a schematic block diagram of an exemplary multiprocessor computer system utilizing an embodiment of the present invention is illustrated. A computer system is generally indicated by the numeral 100 and may comprise a processor complex 102 (which includes a plurality of central processing units ("CPUs")). Also included in the computer system 100 may be core logic 104 (or north bridge), system random access memory ("RAM") 106, a video graphics controller(s) 110, a video display(s) 112, a PCI/SCSI bus adapter 114, a PCI/EISA/LPC bridge 116, and a PCI/ATA controller 118. Single or multilevel cache memory (not illustrated) may also be included in the computer system 100, along with memory being dedicated each of the processors that may be in the processor complex 102. The processor complex 102 may be arranged in a symmetric or asymmetric multi-processor configuration.

In the operation of a multiprocessor computer system, one of the processors that comprise the processor complex 102 may be designated as the bootstrap processor ("BSP") by the system BIOS shortly after the computer system is first powered on. The BSP executes the system power-on self test ("POST") while the other processors (the application processors or APs) remain in a sleeping or quiescent state. After executing the POST, the BSP boots the operating system, which subsequently assigns tasks to the APs.

The processor complex 102 may be connected to the core logic 104 through a host bus 103. The system RAM 106 may be connected to the core logic 104 through a memory bus 105. The video graphics controller(s) 110 may be connected to the core logic 104 through an AGP bus 107 (or other bus for transporting video data). The PCI/SCSI bus adapter 114, PCI/EISA/LPC bridge 116, and PCI/ATA controller 118 may be connected to the core logic 104 through a primary bus 109. The primary bus 109 may be a PCI bus, a PCI-X bus an Infiniband bus or any other suitable data transport construct. For illustrative purposes only, the primary bus 109 will be referred to as a PCI bus herein, although other protocols are suitable as well.

A network interface card ("NIC") 122 and a PCI/PCI bridge 124 may also be connected to the PCI bus 109. Some of the devices on the PCI bus 109, such as the NIC 122 and PCI/PCI bridge 124 may plug into connectors on the computer system 100 motherboard (not illustrated). The PCI/PCI bridge 124 may provide an additional PCI bus 117.

A hard disk 130 and a tape drive 132 may be connected to the PCI/SCSI bus adapter 114 through a SCSI bus 111. The NIC 122 may be connected to a local area network 119. The PCI/EISA/LPC bridge 116 may connect over an EISA/LPC bus 113 to a non-volatile random access memory ("NVRAM") 142, modem 120, and/or an input-output controller 126. The NVRAM 142 may store the system BIOS and/or other programming and may include flash memory. Additionally, the NVRAM may be contained in a programmable logic array ("PAL") or any other type of programmable non-volatile storage. The modem 120 connects to a telephone line 121. The input-output controller 126 may interface with a keyboard 146, CD-ROM drive 144, mouse 148, floppy disk drive ("FDD") 150, serial/parallel ports 152, and/or a real time clock ("RTC") 154.

Figures 2, 3:
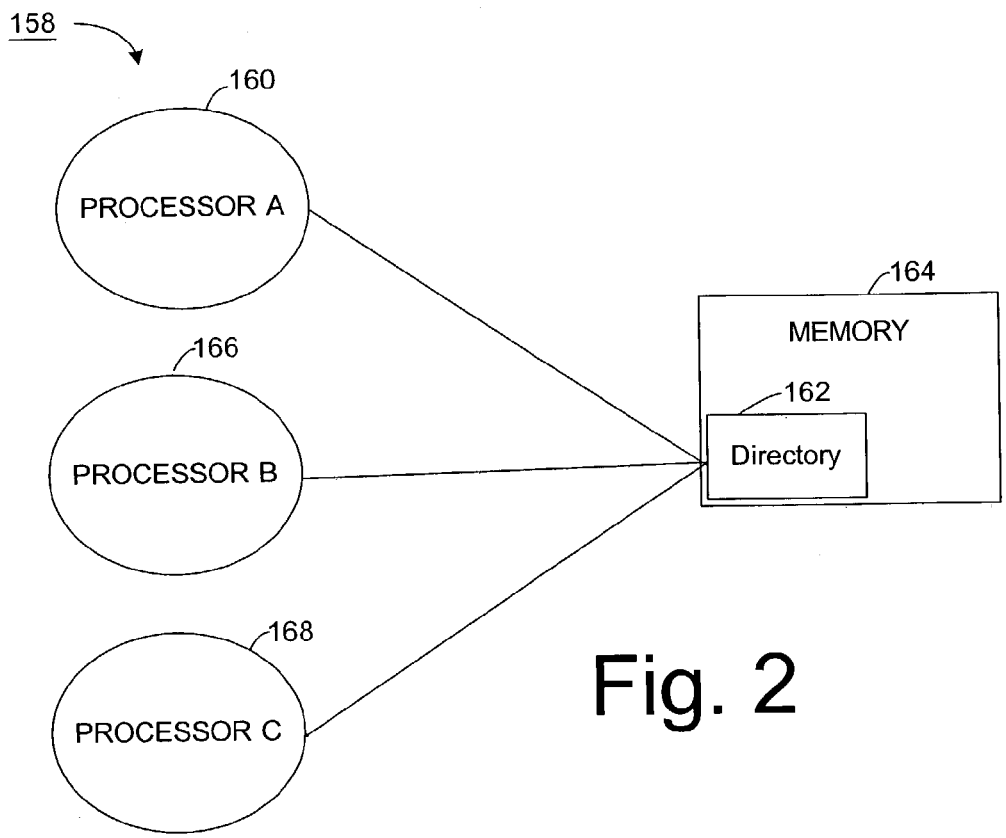
FIG. 2 is a block diagram illustrating a simplified multiprocessor computer system in accordance with embodiments of the present invention.
FIG. 3 is a block diagram of a directory in accordance with embodiments of the present invention.

Referring generally to FIG. 2, a block diagram is shown that illustrates a simplified multiprocessor computer system in accordance with embodiments of the present invention. In this block diagram 158, the multiprocessor complex 102 of FIG. 1 may include multi-processors that communicate to maintain a cache, which may include the most recently accessed information or information that is within a contiguous memory block. To maintain the cache, the processors may interact with a memory array or a directory 162, which may act as the central control point for the cache management of the system. The directory 162 may be within a memory block 164 and may connect to a processor A 160, a processor B 166, and a processor C 168, which may be nodes that include cache controllers, caches, and other components. The function of the directory 162 may be to store status and ownership information of cache lines or memory locations and to manage and maintain cache coherency. As one specific function, the directory 162 may control the flow of information between the processors, such as processor A 160, processor B 166, and processor C 168. In maintaining the coherency of the cache, the directory 162 may utilize a cache coherency model, such as the MESI model, to control the cache size and associated transactions between nodes or processors 160, 166, and 168, which may be interconnected via a links or buses. In operation, these processors 160, 166, and 168 may send requests to the directory 162 for certain cache lines of data. However, depending on the state of the data, the response paths for various transactions may be increased because the cache line requested is in the exclusive state and owned by a remote node.

While the present embodiment of the directory 162 may be utilized as central control for the cache coherency, the directory 162 may be distributed into multiple components where memory is distributed in each node or processor. For instance, the directory 162 may be a plurality of a collection of status tags and associated information regarding the specific region of memory, which may be distributed throughout the system. Alternatively, in snoop-based system, cache coherency is maintained by snooping the cache controllers of the system. The plurality of a collection of status tags may be utilized to further enhance the performance by reducing the processor snoop activity and snoop latency in a snoop-based cache coherency system.

As an example of an extended transaction path, the processor B 166 may make a request for data from memory. This request is delivered to the directory 162 and then may be further directed to the memory 164. The directory 162 may place the requested line into the exclusive state. If the memory data is in the exclusive state, then the data may not be known by any other cache in the system. In this case, the status of the requested data may be controlled by processor B 166, which may be an owning node or processor. If processor C 168 requests a copy of the same data, then another request may be sent to the directory 162. If the data is in the exclusive state, the directory 162 may send a probe or a request for the status of the cache line to processor B 166 because the processor B 166 may be in control of the status of the data. The processor B 166 may send a status update and/or data to directory 162, which may be forwarded to the processor C 168, or directly to processor C 168. Each of the various steps consumes time and adds latency by creating longer response paths, increasing coherency traffic, and increasing the effective memory latency. In this situation, if the directory lookup cycles and memory fetch cycles are overlaid to reduce the effective memory latency, it may not be able to cancel the stale memory fetch cycles appropriately because the directory is over utilized. This results in wasted memory and/or data request bandwidth.

In a multiprocessor system, caches may be utilized to store the information that is being requested and to improve performance. Referring to FIG. 3, a block diagram of a directory in accordance with embodiments of the present invention is illustrated. In the block diagram, a directory 170 may include multiple directory lines 172–186, which may include directory tags 172A–186A and directory data 172B–186B, which may be additional directory information. The directory lines 172–186 may include information that enables the system to operate more efficiently. Specifically, directory tags 172A–186A may include tag information that relates to the status and owner of a corresponding memory location within the directory lines 172–186.

To help maintain coherency of the cache during operation, the directory tags may be assigned states via each of the directory tags 172A–186A. These states may correspond to the states of the cache lines, such as exclusive, shared, or invalid (i.e. uncached). However, other cache coherency protocols may be implemented and the cache and directory may even utilize different cache coherency protocols. This may enable the system to verify if the data within the respective directory lines 172–186 is valid or accessible. Directory data 172B–186B may be associated with the directory tags 172A–186A for each of the directory lines 172–186. The directory data 172B–186B may include additional information that relates to the directory tag. The directory tags 172A–186A and directory data 172B–186B may be utilized independently or jointly to provide information in response to a request to operate the system more efficiently.

For example, the directory line 174 may include a directory tag 174A and a directory data 174B. In this directory line 174, the directory tag 174A may indicate that the memory location corresponding to the directory line 174 may be shared from processor A. Thus, multiple copies of the data may exist in various caches within the system. Similarly, the directory line 172 may include directory tag 172A and directory data 172B. In this directory line 172, the directory tag 172A may indicate that the memory line corresponding to the directory line 172 is exclusive state and owned by processor A. Thus, no other cache may have the recent version of the data and processor A controls any updates of the data. Therefore, as processor A has the most recent version of the data, any request for this data should be directed to processor A.

As systems may operate in different manners, the locality principle may be broken into temporal locality and spatial locality. Temporal locality may be based on the principle that the same instructions may be fetched frequently and continuously, which means that programs tend to use the recently accessed instructions repeatedly from cache. Under this principle, caches that retain recently accessed instructions may optimize the operation of the system by reducing wait time for instructions to be retrieved from memory. However, spatial locality may be based on the principle that programs utilize data that is located in a close proximity to each other. Under this principle, the instructions may be pre-loaded into the cache because it is likely that they will be needed in the execution of the program. By preloading the data into the cache, the system may reduce the associated wait time for the program to access the appropriate data.

As one approach to optimize the system, the directory tags 172A–186A may be organized into a separate list or cache that may include the status of the directory lines 172–186. The collection of status tags and ownership information may be an exclusive status tag logic or circuit ("EST"). The EST may include the status tags that are in a specific state and operate to manage the traffic for these certain tags before the directory or snoop protocol may be utilized. As discussed above, the response path for a request of one of the directory lines 172–186 that is in the exclusive state may result in increased effective memory latency for the system. By including directory lines 172–186 that have data in the exclusive state, any request that is related to one of the directory lines 172–186 that is in the exclusive state may be identified. The list may be utilized to send a response back to the requestor, which informs the requester that the cache line is owned by a remote node or another processor, or send a probe to the exclusive owner of requested data. Accordingly, the time associated with a request for a cache line in the exclusive state may be reduced by storing data based on its state rather than, for example, its proximity to other memory data. Thus, the list of exclusive tags may allow the system to operate in a more efficient manner.

Figure 4:
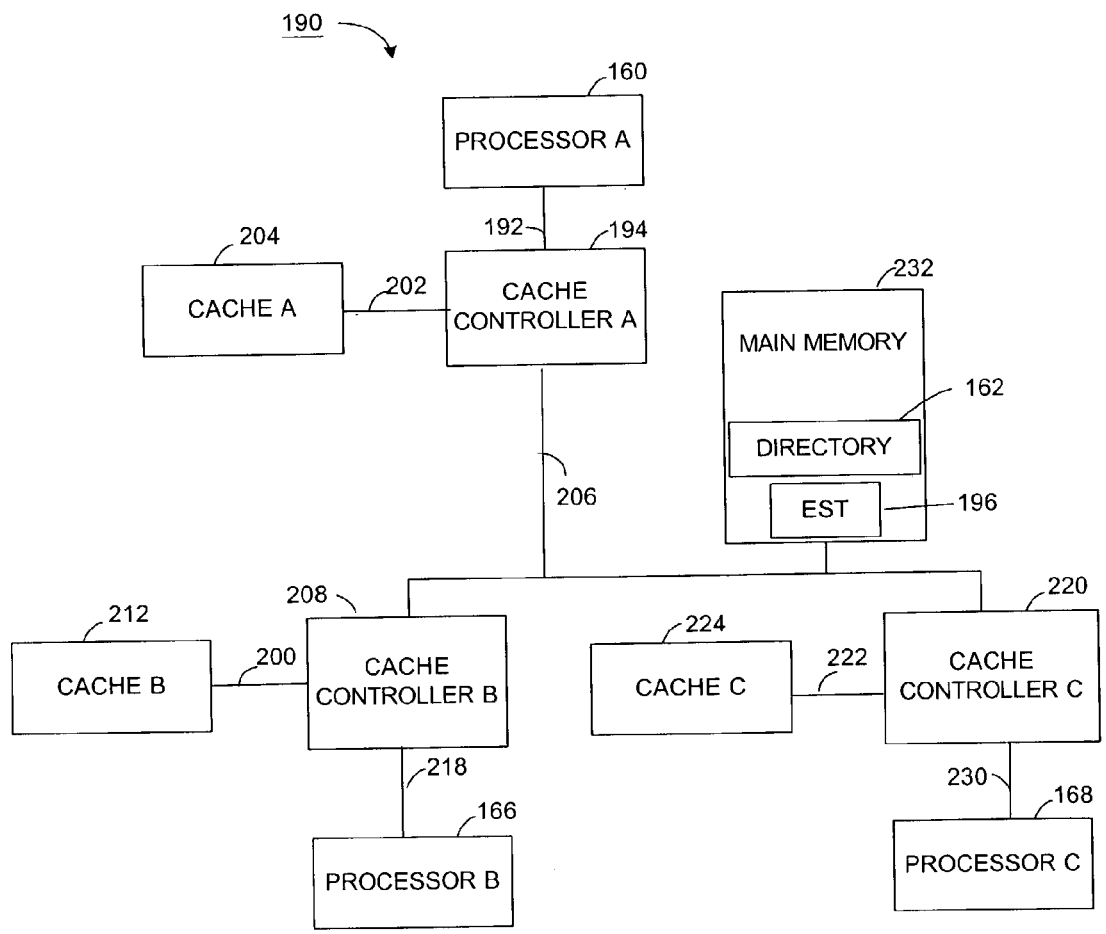
FIG. 4 is a block diagram of a multiprocessor system in accordance with embodiments of the present invention.

To optimize the transaction path in a multiprocessor system, a schematic block diagram of a multiprocessor system according to embodiments of the present invention is illustrated in FIG. 4. In a multiprocessor system 190, the directory 170 may be utilized in a variety of different functions, such as to store information that has recently been accessed or cache lines in a certain state as discussed above. In some embodiments, the multiprocessor system 190 includes three processors to illustrate the present example. However, it should be appreciated by those skilled in the art that different quantities of processors may be utilized with a specific design.

The first processor is processor A 160, may be connected to a cache controller A 194 via a bus 192. The cache controller A 194 may be a logic component or circuitry that may perform the operations of reading, writing, or maintaining memory locations that it is requested to supply. The cache controller A 194 may further connect to other devices to perform various functions.

To interact with the associated memory, the cache controller A 194 may be connected to a cache A 204 via a bus 202, which may include SRAM or DRAM. The cache A 204 may be the location that the cache controller A 194 maintains the state of cache information or preloaded data because the wait time for SRAM is minimal relative to DRAM. Although the DRAM may store more information than the SRAM, it may have a slower access than the SRAM.

In addition to the connections to the different cache 204, the cache controller A 194 may be connected to a cache controller B 208, cache controller C 220, and main memory 232 via a bus 206. The main memory 232 may include DRAM along with SRAM that may be utilized to hold information for the system. The main memory 232 may include a directory 162 or an exclusive status tag logic or circuit ("EST") 196. As discussed above, the directory 162 may be the focal point for all requests and maintains the cache coherency. The EST 196 may interface with the directory 162 and any external connections to the directory 162 to function as a gateway to the directory 162 or to monitor the traffic from the external connections into the directory 162. The EST 196 may be a portion of the directory 162, circuitry, a block of memory, or any other suitable component able to provide this function. The EST 196 may include the list of status tags, the associated owner or other relative information for cache lines in the exclusive state.

The other connections to the cache controller A 194 may be the cache controller B 208 and cache controller C 220. Although these cache controllers 208 and 220 may function in the same manner as the cache controller A 194 described above, these cache controllers 208 and 220 may handle the functions for the processor B 166 and processor C 168, respectively. The cache controller B 208 may be connected to a cache B 212 via a bus 210 and the processor B 166 via a bus 218. Similarly, the cache controller C 220 may be connected to a cache C 224 via a bus 222 and the processor C 168 via a bus 230.

Advantageously, a cache request transaction may be optimized according to the present example, while maintaining the cache coherency as discussed in the following example. In this cache request transaction, the processor B 166 may request a specific line of cache from memory 232, which is not in an exclusive state. This request may be delivered to the EST 196 via the bus 206. The EST 196 may review the request to determine if the cache line is in an exclusive state. Upon determining that the state is not exclusive, the request may be delivered to the directory 162 or may start a memory fetch. The directory 162 may take the request and accesses the cache line from any of the caches 204, 212, or 220 or from the main memory 232. Accordingly, the directory 162 may place the cache line into an exclusive state and may update the EST 196 to include the new status and ownership information of the requested data. Additionally, as an added enhancement, the directory lookup cycles and memory fetch cycles may be overlaid to further enhance performance without unnecessary memory bandwidth waste.

If processor C 168 requests a copy of the cache line, then a request may be sent to the directory 162. This request may be received at the EST 196, which determines if the cache line is in the exclusive state. Then, the EST 196 may respond to the request by sending a message back to processor C 168 to inform the processor C 168 that processor B 166 owns the cache line or may forward a probe request to processor B 166. By monitoring the exclusive state of the cache lines and redirecting traffic, the EST 196 may be able to reduce the effective memory latency by reducing directory lookups, while maintaining the coherency of the cache.

As an alternative embodiment regarding the operation of the multiprocessor system 190, the directory may be divided into two units. A first unit or an abbreviated directory may include cache lines in the invalid, shared, and locally owned states and be referred to as the directory 162. A second unit may include cache lines in the exclusive state and be referred to as the EST 196. The EST 196 may be a portion of the directory 162 or separate logic. In this embodiment, the EST 196 may be located between the remote nodes, such as processor B 166 or processor C 168, and the directory 162. To further increase performance, the EST 196 may be located within other components to reduce the hops between the requester and the owning processor 166. Thus, by moving the location of the EST 196, the response path in the system may be reduced by redirecting the requests, which may improve the systems performance.

To operate, a request may be generated from a local node or a remote node. With a request from a remote node, such as processor C 168, the request may be transmitted to the EST 196. The request may include the address of processor C and the address of the directory. If the EST 196 determines that the cache line requested is in the exclusive state, then the request is changed to a probe and directed to the owning node, which may be processor B 166. The EST 196 updates the change of ownership according to the coherency protocol implemented within the system. Advantageously, this embodiment may reduce or eliminate latency associated with directory 162 lookups and eliminate unnecessary hops between the directory 162 and the EST 196. With regard to a local request, the processor A 160 may transmit a request to the EST 196 and the directory 162. For instance, if the request is to obtain exclusive ownership to a cache line, then the EST 196 and the directory 162 are notified of the request.

Figure 5:
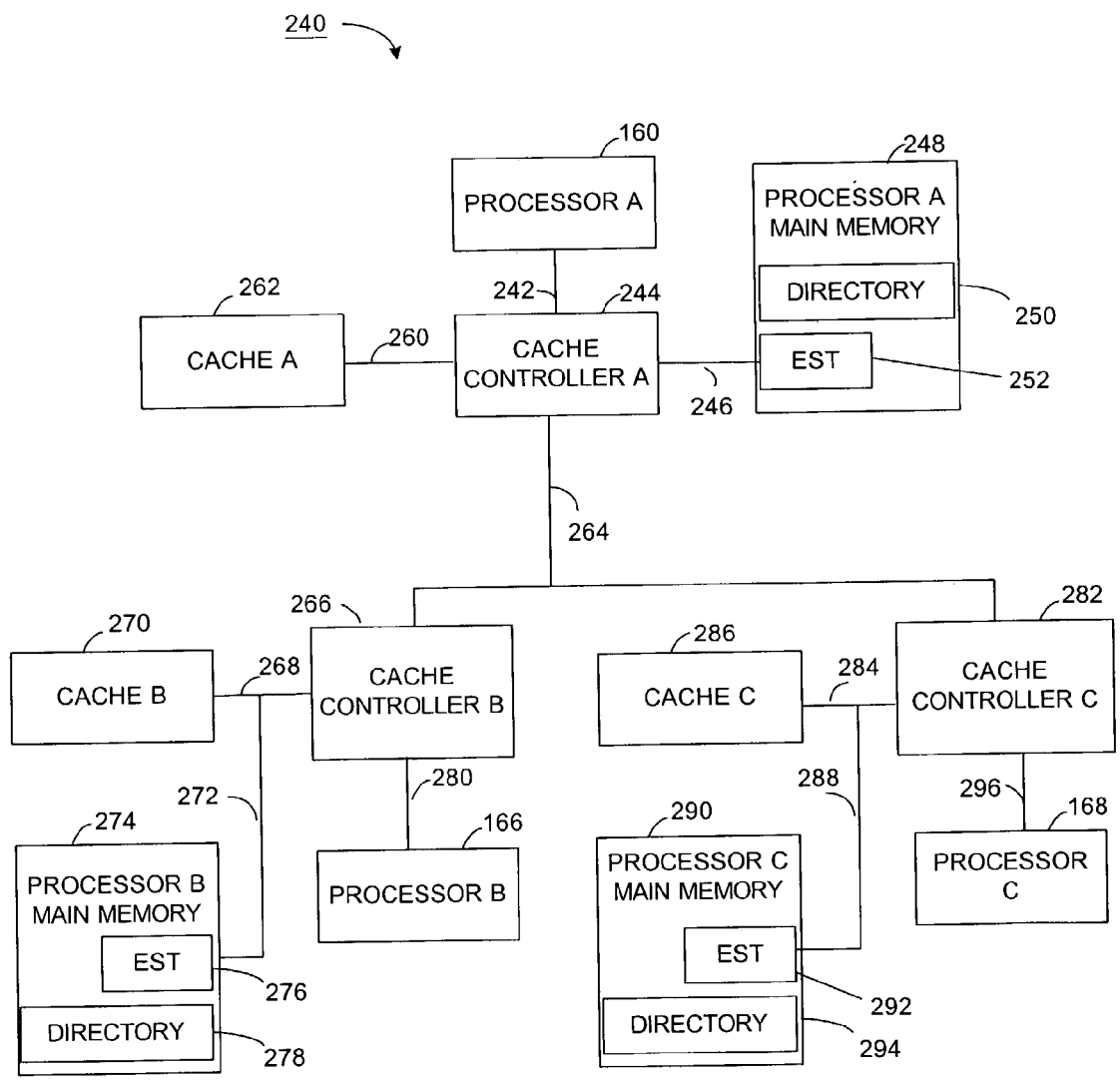
FIG. 5 is a block diagram of a multiprocessor system with multiple memories in accordance with embodiments of the present invention.

Alternatively, as another embodiment, a schematic block diagram of a multiprocessor system with multiple memories according to embodiments of the present invention is illustrated in FIG. 5. In a multiprocessor system 240, the directory 170 may be utilized in a variety of different functions. For instance, the directory may be distributed or assigned to various memory regions to store information that has recently been accessed or cache lines in a certain state as discussed above. In the embodiment, the multiprocessor system 240 includes three processors to illustrate the present example. However, it should be appreciated by those skilled in the art that different quantities of processors may be utilized with a specific design.

The first processor is processor A 160, which may be connected to a cache controller A 244 via a bus 242. The cache controller A 244 may be a logic component or circuitry that may perform the operations of reading, writing, or maintaining memory locations that it is requested to supply. The cache controller A 244 may further connect to other devices to perform various functions.

To interact with the associated memory, the cache controller A 244 may be connected to a cache A 262 via a bus 260, which may include SRAM or DRAM, and a processor A main memory 248 via a bus 246. The cache A 262 may be the location that the cache controller A 244 maintains the state of cache information or preloaded data because the wait time for SRAM is minimal relative to DRAM. Although the DRAM may store more information than the SRAM, it may have a slower access than the SRAM.

The processor A main memory 248 may include DRAM along with SRAM that may be utilized to hold information for the system. The processor A main memory 248 may include a directory 250 or an EST 252, which may be similar to the directory 162 and the EST 196 as discussed in FIG. 4. The directory 250 may be the focal point for all requests and maintains, in part, the cache coherency. The EST 252 may interface with the directory 250 and any external connections to the directory 250 to function as a gateway to the directory 250 or to monitor the traffic from the external connections into the directory 250. The EST 252 may be a portion of the directory 250, circuitry, a block of memory, or any other suitable component able to provide this function. As discussed above, the EST 252 may include the list of cache lines in the exclusive state, the associated owner, or other relative information.

In addition to the connections to the cache A 262 and the processor A main memory 248, the cache controller A 244 may be connected to a cache controller B 266 and cache controller C 282. Although these cache controllers 266 and 282 may function in the same manner as the cache controller A 244 described above, these cache controllers 266 and 282 may handle the functions for the processor B 166 and processor C 168, respectively. The cache controller B 266 may be connected to a cache B 270 via a bus 268, the processor B 166 via a bus 280, and processor B main memory 274 via bus 272. Within the processor B main memory 274 may be a directory 278 and an EST 276. The directory 278 and the EST 276 may operate as discussed with respect to processor A, but may manage the memories associated with the processor B. The cache controller C 282 may be connected to a cache C 286 via a bus 284, the processor C 168 via a bus 296, and processor C main memory 290 via bus 288. Within the processor C main memory 290 may be a directory 294 and an EST 292. These components may function as discussed with regard to processor A. The processor C main memory 290 may include DRAM along with SRAM that may be utilized to hold information for the system.

Advantageously, a cache request transaction may be optimized according to the present example, while maintaining the cache coherency as discussed in the following example. In some embodiments, the processor B 166 may request a specific line of data from processor A main memory 248, which is not in an exclusive state. This request may be delivered to the EST 252 via the bus 246. The EST 252 may review the request to determine if the cache line is in an exclusive state. Upon determining that the state is not exclusive, the request is delivered to the directory 250. The directory 250 may take the request and accesses the cache line from cache A 262 and processor A main memory 248. Accordingly, the directory 250 may place the cache line into the exclusive state and EST 252 may be updated accordingly.

If processor C 168 requests a copy of the cache line, then a request may be sent to the processor A main memory 248. This request may be received at the EST 252, which determines if the cache line is in the exclusive state. Because the cache line is in the excusive state, the EST 252 may respond to the request by sending a message back to processor C 168 to inform the processor C 168 that processor B 166 owns the cache line or may forward a probe request to processor B 166. By monitoring the exclusive state of the cache lines and redirecting traffic, the EST 252 may be able to reduce directory lookups, maintain the coherency of the cache, and reduce the effective memory latency.

As an alternative of this embodiment, the directory 250, 278, or 294 may be divided into two units. A first unit or an abbreviated directory may include cache lines in the invalid, shared, and locally owned states and be referred to as the directory 250, 278, or 294. A second unit may include cache lines in the exclusive state and be referred to as the EST 252, 276, or 292. The EST 252, 276, or 292 may be a portion of the directory 250, 278, or 294 or separate logic. In this embodiment, the EST 252, 276, or 292 may be located between the remote nodes, such as processors 160, 166, and 168, cache controllers 242, 266, and 282, and the directory 250, 278, or 294. To further increase performance, the EST 252, 276, or 292 may be located within other components to reduce the hops between the requestor and the directory 250, 278, or 294. Thus, by moving the location of the EST 252, 276, or 292 the system may reduce the response path associated with the request and improve the systems performance.

In addition, the design may be influenced by other factors as well. For instance, the EST 252, 276, or 292 may be located in various locations to reduce the delay associated with additional hops or to reduce directory lookups. With the EST 252, 276, or 292 being located near the directory 250, 278, or 294, the EST 252, 276, or 292 would provide the largest impact to the reduction of directory lookups. As discussed above, with the directory being the central point of contention, the system may be designed to optimize this aspect. However, the EST 252, 276, or 292 may be located near or adjacent to the remote nodes or the center of traffic to provide for the reduction of hops. Accordingly, the selection of either location may be a design choice that enables the system to operate in a more efficient manner.

Figure 6:
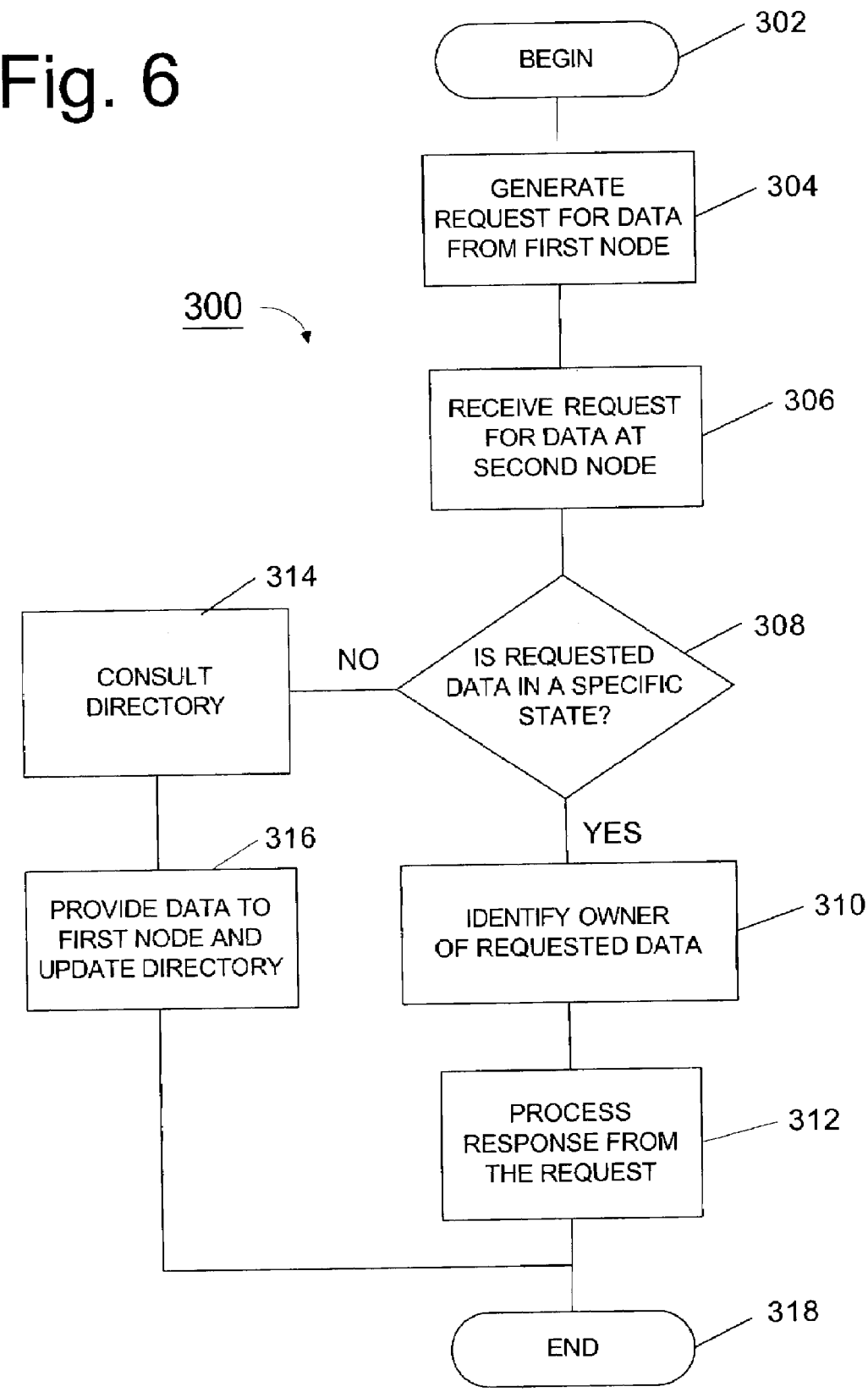
FIG. 6 is a process flow diagram in accordance with embodiments of the present invention.

Turning to FIG. 6, a flow diagram is illustrated in accordance with an embodiment of the present invention. In the diagram, generally referred to by reference numeral 300, the interactions between the various components discussed above are shown. The process begins at block 302. At block 304, a request for data may be generated from a first node or processor. The request may be for a specific line of cache that includes an instruction, recently accessed data, or consecutive operations in a program. For instance, the data request may be from the processor C 168, as discussed with regard to FIGS. 2–5. At a second node, the request may be received in a step 306. As discussed before, the second node may be the EST 196, 252, 276, and 292 of FIG. 4 or 5.

Once the request is received at the second node, in step 308, the request, which may depend upon the state of the tag, may be examined to determine if request is for a data or a cache line in a specific state. Depending on the outcome, the request may be processed differently. For instance, if the tag is in the shared state, then the request may be forwarded to the directory and the data accessed from another cache or the main memory. Yet, if the data is in an exclusive state, then the request may be changed into a probe and forwarded to the owning node. In operation, as discussed above, the EST determines the status of the cache line requested to enhance the systems performance. If the request is for data in a specific state, the owner of the requested data may be identified in step 310. In step 312, a response may be transmitted to the first node with the status of the data or the owner of the data, processed by forwarding the information to owning node, or handled in another manner that does not utilize the directory. However, if the data is not in the specified state, then the directory may be consulted in step 314. Once the directory determines the status of the data, the directory may send a response to the first node with the requested information and update the directory in step 316. Accordingly, the process ends at block 318.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A tag system for use in a multiprocessor computer system having a plurality of nodes, the tag system comprising:
   a collection of directory tags for a plurality of data components; and
   a status tag logic coupled to and associated with the collection of directory tags, the status tag logic configured to:
   store at least one status tag associated with the collection of directory tags, wherein the status tag comprises information regarding a state and owner for at least one of the plurality of components of data;
   monitor a request for data directed to the collection of directory tags; and
   respond to the request for data by processing the request without accessing the collection of directory tags if the status tag associated with requested data indicates that the requested data is in one of at least one particular states.

2. The system set forth in claim 1, wherein the one of at least one particular states comprises an exclusive state.

3. The system set forth in claim 1, wherein the status tag logic determines whether data requested by the request for data is for data in an exclusive state and whether the owner of the requested data is another one of the plurality of nodes.

4. The system set forth in claim 3, wherein the collection of directory tags is not accessed if the status tag logic determines that the data requested by the request for data is in the exclusive state and that the owner of the requested data is another one of the plurality of nodes.

5. A computer system, comprising:
   a plurality of processors adapted to execute commands and control the operation of the computer system;
   a collection of status tags;
   a status tag logic coupled to and associated with the collection of status tags, status tag logic configured to:
   store information regarding a state and owner for each of a plurality of components of data;
   monitor a request for data from one of the plurality of processors to the collection of status tags; and
   respond to the request for data by processing the request without accessing a collection of directory tags if the state associated with requested data indicates that the requested data is in one of at least one particular states;
   a storage device that is adapted to store data, including commands for use by one of the plurality of processors; and
   a system memory adapted to store data for use by at least one of the plurality of processors.

6. The system set forth in claim 5, wherein the one of at least one particular states comprises an exclusive state.

7. The system set forth in claim 6, wherein the response to the request is transmitted from one of the status tag logic and the collection of status tags.

8. The system set forth in claim 6, wherein the collection of directory tags is not accessed if the status tag logic determined that the data requested by the request for data is in the exclusive state.

9. A method of operating a tag system for use in a multiprocessor computer system having a plurality of nodes, the method comprising:
   monitoring a request for data from one of the plurality of nodes directed to a collection of directory tags by a status tag logic coupled to and associated with the collection of directory tags; and
   responding to the request for data by processing the request without accessing the collection of directory tags if a status tag associated with requested data indicates that the requested data is in one of at least one particular states.

10. The method set forth in claim 9, wherein the one of the plurality of nodes comprises the status tag.

11. The method set forth in claim 9, comprising determining whether data subject to the request for data has an exclusive status.

12. The method set forth in claim 11, wherein an identity of the owner of the requested data is provided to the requesting node if the status of the requested data is the exclusive state and the owner of the requested data is one of the plurality of nodes.

13. A status tag system for use in a multiprocessor computer system having a plurality of nodes, the status tag system comprising:
   means for storing information regarding a state and owner for each of a plurality of components of data;
   means for processing requests for information regarding a subset of the plurality of components of data based on a state associated with members of the plurality of components of data;
   means for monitoring a request for data directed to a collection of directory tags; and
   means for responding to the request for data by processing the request without accessing the collection of directory tags if a status tag associated with requested data indicates that the requested data is in one of at least one particular states.

14. The system set forth in claim 13, wherein the subset of the plurality of data components is in an exclusive state.

15. The system set forth in claim 13, wherein the means for storing information comprises a cache.

16. The system set forth in claim 13, wherein the means for storing information comprises a status tag logic.

17. The system set forth in claim 13, wherein the means for determining comprises means for evaluating the state of the requested data.

18. The system set forth in claim 17, wherein the means for evaluating comprises analyzing if the requested data is in an exclusive state.

* * * * *